United States Patent [19]
Behl et al.

[11] Patent Number: 5,749,958
[45] Date of Patent: *May 12, 1998

[54] DELAMINATED KAOLIN PIGMENTS THEIR PREPARATION AND USE IN PAPER COATING

[75] Inventors: Sanjay Behl, Macon, Ga.; Saad Nemeh, West Long Branch, N.J.; Mitchell J. Willis, Macon, Ga.; Joseph P. Berberich, Barnegat, N.J.

[73] Assignee: Engelhard Corporation, Iselin, N.J.

[*] Notice: The term of this patent shall not extend beyond the expiration date of Pat. No. 5,645,635.

[21] Appl. No.: 677,758

[22] Filed: Jul. 10, 1996

Related U.S. Application Data

[63] Continuation of Ser. No. 384,973, Feb. 7, 1995, abandoned.

[51] Int. Cl.$^6$ ................................................. C04B 14/04
[52] U.S. Cl. ........................................ 106/416; 106/486
[58] Field of Search ................................ 106/416, 486

[56] References Cited

U.S. PATENT DOCUMENTS

| | | | |
|---|---|---|---|
| 3,171,718 | 3/1965 | Gunn et al. | 23/110 |
| 3,615,806 | 10/1971 | Torok | 106/416 |
| 4,943,324 | 7/1990 | Bundy et al. | 106/486 |
| 4,948,664 | 8/1990 | Brociner | 428/331 |
| 5,085,707 | 2/1992 | Bundy et al. | 106/486 |
| 5,169,443 | 12/1992 | Willis et al. | 106/486 |
| 5,371,051 | 12/1994 | Pope et al. | 501/145 |

*Primary Examiner*—Paul Marcantoni
*Attorney, Agent, or Firm*—Inez L. Moselle

[57] ABSTRACT

Paper coating pigments comprising a product obtained by the controlled mechanical delamination of kaolin particles. The pigments provide improved opacification, brightness, printing properties and gloss compared to conventional delaminated kaolin pigments. The pigment of the invention is particularly useful for coating light weight printed paper and provides a unique combination of high opacity, brightness and gloss not available when using other kaolin pigments. The novel pigment is specifically designed to replace plastic pigments and (or) titanium dioxide in coating formulations while maintaining or improving desired paper properties.

8 Claims, No Drawings

DELAMINATED KAOLIN PIGMENTS THEIR PREPARATION AND USE IN PAPER COATING

This is a continuation of application Ser. No. 08/384,973, filed Feb. 7, 1995, now abandoned.

FIELD OF INVENTION

This invention relates to paper coating pigments comprising novel mechanically delaminated kaolin particles having controlled particle size and shape. The pigments provide improved opacification, brightness, printing properties and gloss, especially high print gloss, compared to conventional delaminated kaolin particles.

BACKGROUND

A wide variety of coated printing papers are produced commercially. Such papers are prepared by coating suitable base stock with a pigmented coating composition. The coating composition is frequently called "coating color". Among the principal properties of a paper which are affected by applying the coating are smoothness, ink receptivity and gloss.

In recent years most coated papers have been used for advertising matter, periodical, etc. This type of paper usually has a high gloss, i.e., paper having a TAPPI (75°) gloss of 50% or higher. The glossy finish is desired to emphasize the contrast in half-tone prints and to satisfy aesthetic demands. Fine particle size kaolin clays, e.g., clay that is at least 80% by weight finer than 2 micrometers, e.s.d., is usually the main or sole constituent of the pigment employed in the production of a high gloss coated printing paper. A coating color containing the fine particle size clay pigment is applied to a suitable base paper. The coated paper is dried and subjected to super calendering. Such calendering serves to produce a smooth surface which responds well to printing. Calendering also serves to develop the desired high-gloss finish.

It is well known that the particle size of pigments has a great effect on functional properties. It has long been recognized that in cases of kaolin clays coating pigments, the greater that amount of particles finer than 2 micrometers (e.s.d.) in the clay, the smoother and glossier the coating.

However, the opacity suffers as the amount of fines less than 2 micrometers increases. This has been explained by the fact that the kaolin particles finer than 2 micrometers have a different morphology from the particles greater than 2 micrometers. The 2 micrometers particle size is the approximate cutoff point below which the kaolinite particles in a naturally occurring kaolin may exist as thin individual crystalline plates. Above this cutoff point the kaolinite particles exist as bonded stacked aggregates of platelet (so called "stacks" or "booklets") or, in some cases, long, wormlike assemblies of platelet.

Conventional kaolin clay crudes used as a sources of pigment grades of kaolin usually contain about 40% to 60% by weight of particles finer than 2 micrometers after removal of grit and coarse impurities. The kaolin portion of the kaolin crude is polydispersed in the sense that the particles occur over a range of sizes and shapes. Thus, a kaolin crude will not contain particles of a single size, such as, for example, particles all of which are 2 micrometers. Typically a degritted kaolin crude will contain particles ranging in size from sub-micron (or colloidal) to particles that are 20 micrometers or larger. Such degritted clays are too coarse to be used in a high-gloss paper. Conventional practice is to remove a preselected portion of plus 2 micrometers particles from the finer clay particles. This is accomplished by forming the crude clay into a dispersed aqueous pulp, removing the gross impurities by means such as screening, and then hydraulically fractionating the clay to remove a desired proportion of clay particles larger than 2 micrometers. The fractionation is usually carried out by using centrifuges in commercial operations. The product from the centrifuge is a suspension having a higher percentage of finer particles than the starting clay. After bleaching (and possibly other beneficiation), the fine fraction is sold as a paper coating pigment. When the centrifugation is controlled so as to produce a fine size fraction in which at least 90% by weight, of the particles is finer than 2 micrometers, the pigment is termed as No. 1 grade. A No. 2 grade is about 80% finer than 2 micrometers. A No. 3 grade is relatively coarser, i.e., about 70% finer than 2 micrometers. A No. 1 grade has a higher content of platelet finer than 2 micrometers than does a No. 2 grade. Hence, the No. 1 grade yields a glossier coating than a coarser No. 2 grades under equal calendering conditions.

In producing these fine grades from crudes, the underflow from the centrifuges is a coarse-size fraction of the clay. Typically the underflow contain 20% to 40% by weight of particles finer than 2 micrometers. Thus, the underflow is composed predominately of kaolinite stacks or booklets. Coarser-size fraction of the kaolin clays crudes, exemplified by the commercial product supplied under the trademark "NOKARB", are used to a limited extent as fillers. Frequently a portion of, or even the entire, coarse fraction is discarded because of the limited demand for such clays.

In recent years, some of the coarse particle size fractions of kaolin crudes have been used as feed material in the production of mechanically delaminated kaolin pigments. It has long been recognized in the industrial minerals industry that mechanical delamination of kaolin stacks present in the coarse particle size fraction of many kaolin crudes provide kaolin pigments with improved opacification as well as enhanced smoothness in paper coating. See, for example U.S. Pat. No. 3,171,718, Gunn et al. In practicing delamination, a suspension of a coarse particle size fraction of a kaolin crude is agitated with grinding media such as sand, plastic pellets or glass microballoons until the booklets in the feed clay are cleaved and delaminated particles are produced. Similar results may be obtained when a paste of clay is extruded under high pressure ("superstrusion"). After the kaolinite booklets are delaminated, a suspension of the clay may be fractionated. A fine size fraction containing the artificially produced platelet with dimensions of 2 micrometers and finer is recovered. The fine size fraction is used as a paper coating pigment. It is recognized that paper coated with the fine mechanically delaminated platelets has a high gloss. Many commercial grades of fine particle size mechanically delaminated clays are sold under the trade names which include the term "sheen" in recognition of the high glossing potential of these clays. Coarse size fractions of the mechanically delaminated clays a-re usually discarded after recovery of the desired minus 2 micrometers coating fraction.

Particle sizes of kaolin are conventionally determined by sedimentation using Stoke's Law to convert settling rates to particle size distribution, and assume a spherical particle shape for the kaolin particles. Hence, the use of conventional term "equivalent spherical diameter (e.s.d)" to designate particle size. It is well known that the expression of the particle size in terms of equivalent spherical diameter is not accurate in the case of particles having a high aspect ratio such as mechanically delaminated platelets.

It has also been recognized that a relative narrowing of the particle size distribution of mechanically delaminated as well as non-delaminated kaolin particles results in pigments providing improved smoothness to paper along with improved printability. Such pigments are disclosed as being especially advantageous when used in the manufacture of lightweight coated paper for rotogravure printing (see U.S. Pat. No. 4,948,664, Brociner et al). The characteristics of the delaminated pigments are particularly beneficial in the coating of groundwood-containing paper base stock. Such base paper usually is substantially less bright and has a rougher surface than chemical wood-free base stock. It is well known to remove ultrafine kaolin particle, e.g., particles finer than about 0.3 micrometers, e.s.d. after delamination. This obviously contributes to the production of a delaminated pigment product having a narrower particle size distribution than it would have if the ultrafines were not removed.

U.S. Pat. No. 4,948,664, supra, shows that in cases where very narrow particle size distribution was required, delamination was followed by a coarse fractionation and secondary fine removal steps. Patentees did not remove the primary fines prior to delamination. In illustrative examples, there was a significant amount of secondary fines that were generated during delamination which had to be removed later. Removal of fines is referred to "defining" in U.S. Pat. No. 4,943,324 Bundy et al., and U.S. Pat. No. 5,085,707, also Bundy et al. In these patents, defining is always conducted after a delamination step. Sometimes removal of the fines is termed "desliming". Typical commercial delaminated kaolin pigments, exemplified by NUCLAY kaolin supplied by Engelhard Corporation, are about 80% by weight finer than 2 micrometers, e.s.d. Thus, the particle size distribution of such commercial delaminated kaolin as measured by sedimentation is typical of that of No. 2 nondelaminated coating clay. U.S. 5,169,443 Willis et al., commonly assigned, makes reference to certain delaminated kaolins that are about 90% by weight finer than 2 micrometers, thus similar to No. 1 coating clays.

Surface area is a property related to particle size of kaolins although surface area alone does not correlate directly with particle size. Surface area is expressed in terms of square meters of area per gram of a material and is frequently measured by the BET method using nitrogen as adsorbate. Mercury porosimetry is also used to measure surface area. A No. 1 clay, which typically has a large number of fine particles, has higher surface area than a No. 2 clay, because fine particles have a higher surface area than coarse particles. Use of surface area as a parameter in evaluating delaminated kaolins appears in U.S. Pat. No. 5,169,443, Willis et al., supra.

The performance property most closely related to surface area is binder demand. A typical paper coating contains mostly kaolin particles with some binder such as starch or latex to hold the particles together and to maintain adherence to the paper. The higher the surface area of the kaolin pigment, the more binder it will take to bind pigment particles onto the sheet. Binder is expensive and it impairs virtually all paper properties including opacity and gloss. If there is not enough binder, the coating will flake off the sheet at the printing press; this results in very small, undesirable white patches in the printed sheet. It is common practice to evaluate this property by the IGT pick test. Pick strength is only critical for offset printing; offset ink is very tacky, having the consistency of maple syrup; considerable peeling forces are generated between the paper and the press plate during offset printing.

On the other hand, finer particles, associated with higher surface area, generally mean a glossier coating. Thus, the removal of fines to reduce binder demand is usually associated with an undesirable decrease in gloss.

SUMMARY OF THE INVENTION

One aspect of this invention stems from the discovery that the production of extremely platy kaolin particles devoid of primary and secondary fines is of unexpected benefit. The pigment thus produced results in superior optical and printing properties, including high print and sheet gloss, when coated on paper as compared to results obtained using No. 1, No. 2 and delaminated standard kaolin pigments.

Since the delaminated products of the invention are typically about 90% by weight finer than 2 micrometers, they can be classified as No. 1 kaolin clay pigments; however, the surface area is much lower than that of the conventional No. 1 clays of such particle size. The surface area of delaminated pigment of the invention is typically that of a No. 2 kaolin, e.g., from about 9 to $m^2/g$ when measured by the BET method.

Pigments of this invention provide improved opacification, brightness, printing properties including print gloss and sheet gloss compared to conventional delaminated kaolin pigments. Pigments of this invention are particularly useful for coating lightweight (LWC) printed paper. When used in the production of LWC printed paper, the coated paper possesses a unique combination of high opacity, brightness, and high gloss not available when using other kaolin pigments. The pigments are specifically designed to replace plastic pigments and (or) titanium dioxide in coating formulations while maintaining or improving the desired paper properties. The opacifying powers of pigment of this invention may also be valuable in paper filling or wet end applications.

Another aspect of the invention resides in a novel method of producing delaminated kaolin pigments which features a desliming step prior to delamination. The prior art practice has been to deslime after delamination in those cases where a combination of delamination and desliming steps have been applied to kaolin. A major benefit from this processing is that superior delamination rates are achievable when practicing desliming before delamination. This also results in a more uniformly delaminated product, since the fines have a very poor response to mechanical delamination. More specifically, the fines do not respond to delamination because of the lack of presence of "booklets" in these fine size ranges. Removal of primary fines, also improves dispersion quality of the slurry prior to delamination. This may further enhance the delamination rate and would also give more controlled delamination.

Another feature of the method of this invention resides in limiting generation of secondary fines by controlling the delamination process such that essentially no fines are generated during the process. Thus, delamination is controlled so as to avoid generating enough fines to change significantly the particle size distribution and the surface area of the product. Prior art delamination processes that result in No 1 clays generate substantial amounts of fines. Control of the delamination to minimize excessive fine production is effected by control of the Delamination Index (DI), hereinafter described.

DESCRIPTION OF THE PREFERRED EMBODIMENTS

The novel hydrous kaolin pigments of this invention are adapted for coating paper adapted to be printed by offset and gravure and comprise extremely platy kaolin particles with a controlled amount of primary and secondary fines. Primary fines are defined as colloidal particles in the crude with sizes smaller than 0.2 micrometers. The secondary fines are colloidal particles finer than 0.2 micrometers that are a product of a unit operation (such as delamination) capable of producing highly platy particles.

The novel delaminated kaolin pigments have the following characteristics:

Controlled Particle Size Distribution

Greater than or equal to 85% by weight finer than 2 micrometer;

45% by weight finer than 0.5 micrometer, preferably 25% to 45%, most preferably 30% to 40%, finer than 0.5 micrometers;

20% by weight finer than 0.3 micrometer, preferably 10% to 20%, most preferably 10% to 15% finer than 0.3 micrometers;

10% by weight or less finer than 0.2 micrometer, preferably 0% to 7%, most preferably 0% to 5% finer than 0.2 micrometers;

Average particle size in the range 0.55 to 0.9 micrometers, most preferably 0.6 to 0.7 micrometers.

Surface Area

BET surface area preferably between 9–15 $m^2/g$, most preferably 11–14 $m^2/g$;

Ratio of the surface area by Mercury porosimetry/BET surface area between 0.6 and 0.95 and most preferably 0.7 to 0.8;

Block brightness preferably between 80–95%, most preferably 88–90.5%.

Platy Nature

Another feature of the pigment is its extremely platy nature, where the platiness is defined in terms of Delamination Index (D.I), which is defined as change in % finer than 2 micrometers during delamination process, i.e.; D.I.=% by weight finer than 2 micrometers in product-% by weight finer than 2 micrometers in feed. D.I. of the pigment is 20–45, with preferably in the range of 25–35 and most preferably about 30. 15 A starting crude kaolin useful in practicing this invention is known in the art as "soft" kaolin. Such crudes mined, for example in Central Georgia, contain particles with booklet morphology. After degritting in conventional manner to remove the oversize grit, the particle size of the kaolin is, typically that shown in the accompanying illustrative examples. The "soft" kaolin crudes mined in Central Georgia usually contain about 5–25% by weight of particles finer than 0.3 micrometers. The fine particles in such crudes, e.g., the particles finer than 2 micrometers e.s.d., contain very fine booklets or fine individual particles. Removal of these fine particles/booklets (primary slimes) in accordance with the invention followed by delamination (instead of subsequent to) helps to produce particles with desired high aspect ratios and also limits generation of fines during delamination. Since the fines are known to have a poorer response to delamination, removal of these fines helps to increase the rate of delamination. This results in reduced processing costs.

Typically the crude is initially crushed and then blunged in water, preferably containing a clay dispersant, such as, for example, a mixture of soda ash and sodium silicate, or a condensed phosphate salt, e.g., tetrasodium pyrophosphate, sodium polyacrylate or mixtures thereof. Generally, solids of the blunged clay are in the range of 30% to 65%, usually about 40% by weight. The blunged clay is then degritted by known means such as the use of screens or gravity settling to remove oversize (grit). Suitable for this purpose are 200 or 325 mesh (U.S. Standard) screens. The degritted slip of kaolin is then deslimed to remove substantially all of the particles finer than 0.2 microns. Continuous high speed centrifuges such as those equipped with nozzle bowls or scrolls can be used, or gravity settling can be employed for desliming. Satisfactory results may be obtained with degritted crude by operating the centrifuge to remove and then isolate a fine size fraction of which about 95% by weight of the particles are finer than 0.5 micrometers and a deslimed fraction which is about 50–65% by weight finer than 2 micrometers. Typical solids of the coarse fraction are higher (typically about 10%) than the feed. Typically, 10–25% of the total material is removed as fines. The coarse size fraction remaining after centrifugation to separate the slimes is used as delaminator feed. When a fine fraction is separated in the first classification step, the population of particles comprising the delaminator feed consists of a higher proportion of large kaolin books and plates than occurs in population of kaolin particles contained within the kaolin slip prior to classification.

As mentioned, it is a feature of this invention to avoid excessive delamination. The term "excessive" delamination as used herein implies generation of an excessive amounts of fines during the delamination operation. The unit operation is intended to peel a booklet to individual platelet and not fracture, chip or abrade the platelet. During "excessive" delamination the booklets are not only peeled but also fractured.

Data in the patent of Willis et al., supra, indicate that they produced a No. 2 clay which is very coarse as compared to the high print gloss product of the invention. Delamination of a typical No. 3 clay to a No. 1 clay without removal of primary fines would result in excessive delamination. However if a No. 3 clay is delaminated to a standard No. 2 particle size the delamination may not be excessive. A Delamination Index of or greater without removal of primary fines is termed "excessive" delamination. Kaolin particles which have an excessive delamination will have a relatively smaller aspect ratio as compared to other delaminated particles. A good measure of "excessive" delamination is the difference in the Delamination Index at 2 micrometers and 1 micrometer. Excessive delamination occurs when the Delamination Index at 1 micrometer is equal to or larger than that at 2 micrometers.

The process of delaminating the clay can be practiced using fine milling media in a batch operation but is advantageously carried out in a continuous manner. Non-limiting examples of milling media are small ceramic balls, coarse sand, plastic cylinders, beads, or pellets of nylon, styrene-divinyl benzene copolymer, polyethylene or other plastic. The media acts upon a suspension of the clay in water.

Most preferably, the milling media is minus plus 50 mesh (US sieve) styrene divinyl benzene copolymer beads.

Generally, the volume of beads to clay slurry varies between 20–70%, most preferably between 35% and 50%. The clay feed to the process should typically be controlled between 20% to 50% solids; however, optimum processing conditions are often achieved between 35 and 45% solids.

A suitable vessel used for the delamination process contains vertical baffles and typically has a height to diameter ratio greater than 1.0 and optimally 1.5 to 2.0. Such a vessel is equipped with an agitation system containing multiple agitator elements attached to a vertical shaft. The number and spacing of the agitators must be optimized for the specific process conditions in order to impart the necessary combined shear and percussive and frictional energy input necessary to overcome the Van der Waals forces holding individual platelets in a stacked array. Energy input required for delamination will vary due to differences between crudes, process conditions, and equipment; typically, the process requires from about to 50 horsepower hour per ton of clay charged to the delaminators.

In continuous delamination, the clay is fed continuously into a delaminating apparatus and the discharge from the apparatus is advantageously combined with a fractionation of the clay, returning the coarser clay to the apparatus while removing only the finer clay of the desired particle size. The selective takeoff of finer clay, while returning the coarser clay to the vessel in which the delamination is taking place, has the advantage that the overall process yield can be improved and plates greater than 5 micrometers face diameter can be fractured to meet the desired particle size attributes. In this manner, the clay remaining in the apparatus during the continued operation is made up mainly of the coarser clay particles which are undergoing delamination and which are continuously freed from finer clay particles by the selective draw off and fractionation and return of coarser clay particles.

In this continuous withdrawal of clay suspension, separation of finer clay and return of coarser clay to the apparatus is also advantageously continuous, and can be accomplished by subjecting the withdrawn clay to a centrifugal separation with return of the coarser clay to the apparatus, or by the use of one or more cyclone separators which will separate the finer clay fraction and return the coarser clay to the apparatus.

The slip of delaminated clay is then optionally centrifuged to remove oversize, e.g., particles larger than 2 micrometers, as an underflow and the overflow product which is then passed through a high intensity magnetic separator, followed by bleaching, filtration and drying to produce product of the invention.. The centrifuged underflow containing oversize may be blended with appropriate levels of delaminated and/or undelaminated clay to achieve blends of desired particle size distribution and further processed in a conventional manner, e.g., magnetic purification and for bleaching, to produce other advantageous kaolin products.

The slimed fraction separated from the coarser kaolin prior to delamination may be discarded or it may be processed in a conventional manner, e.g., magnetic purification and/or bleaching, to produce a product with very fine particle size distribution.

It is also within the scope of the invention to delaminate with grinding media other than plastic beads, e.g., by sand, zircon or glass beads or by the delamination process known as "superstrusion". Conventional pre and post processing steps such as flotation, selective flocculation, magnet separation, floc/filtration, bleaching and spray drying may be employed. In downstream processing, a Netzsch mill may be used when it is desirable to produce a product with a particle size of 90% finer than 2 micrometers. Milling in a Netzsch mill involves shearing a suspension of the particles using a particulate media. Glass is preferred. This method is useful in producing fine particles more efficiently than when practicing standard delamination. Double delamination can be practiced. However, an undesirable feature of double delamination is the problem of controlling the generation of colloidal fines.

Optionally, the product discharged from the delamination/ Netzsch milling may be subjected to high shear milling to improve the high shear viscosity.

Delaminated kaolin pigments of the invention can be advantageously used as the single pigment in coating color formulations used to coat paper and paper board. However, it is also within the scope of the invention to employ pigments of the invention in blends with other kaolin and non-kaolin pigments, and to use the blends to coat paper and paperboard. Such blends may be produced prior to the preparation of coating color formulations or produced concomitant with the preparation of coating color formulations.

Delaminated pigments of this invention are particularly advantageous when used as the single pigment to coat ground wood-containing lightweight coated paper. A typical ground-wood containing lightweight paper base stock, suitable for coating, may have the following characteristics:

Basis weight: 24 lbs/3300 ft$^2$ or 36 g/m$^2$
Brightness: 67.5%
Opacity: 76%

Paper coated with a pigment of the invention has a sheet gloss which is usually from 5 to 15 points greater than paper coated with a standard delaminated kaolin pigment such as NUCLAY pigment. Print gloss is usually from 4 to 15 points higher. The coated paper also has high opacity and smoothness.

In preparing coating color formulations, coating pigments are admixed in a conventional manner with other constituents and binders (materials that bind the coating pigments to the paper base stock surface). Coating color formulations will vary from mill to mill for the same end-use application, and will differ on the basis of the surface characteristics required by different printing methods commonly used.

Typical Light Weight Coated (LWC) Paper-Coating Formulations

| Offset Paper | Rotogravure Paper |
|---|---|
| Europe | |
| 100 pts pigment | 100 pts pigment |
| 10 pts Dow 685 | 4.8 pts Acronal ® 548 |
| 5 pts PG280 | 0.5 pts Nopcote ® C-104 |
| 0.5 pts Nopcote ® C-104 | |
| 0.5 pts Sunreze ® 700C | |
| United States | |
| 100 pts pigment | 100 pts pigment |
| 8 pts PG280 | 7 pts PG 280 |
| 8 pts CP640 A | 4 pts CP620 A |
| 0.5 pts Nopcote ® C-104 | 5 pts Nopcote ® C-104 |
| 0.5 pts Sunreze ® 700C | | pts = parts by weight

All particle sizes used in the specifications and claims are determined with the SEDIGRAPH 5100 particle size analyzer and are reported as equivalent spherical diameter (e.s.d) on a weight percentage basis.

In the examples, the following test procedures were used:
Print Gloss 75 Degree (TAPPI 480)

This test evaluates the specular reflectance from a light source shining on a sheet of paper that is printed using a commercial black glossy ink, at an angle of 75 degree from the vertical, expressed as percentage of the intensity of the light source. It is measured using the same equipment as that of measuring the sheet gloss. (See below.) The higher this number, the glossier is the print, which gives a better printed image.

Brightness (TAPPI 646)

This test provides a measure of the ability of a sheet to reflect light incident at a fixed angle, expressed as a percentage of the intensity of the incident light. A light source with a single wavelength of 457 nm is used. It is measured using Technityne Model S4-4 Brightness meter.

Sheet Gloss 75 Degree (TAPPI 480)

The specular reflectance from a light source shining on a sheet of paper at an angle of 75 degree from the vertical, expressed as percentage of the intensity of the light source is measured, using a Hunter Lab Glossmeter, Model D48-7.

Opacity (%) (TAPPI 425)

This provides a measure of the hiding power of a paper sheet. B&L opacity is measured using a light source with a wavelength of 577 nm. The opacity measurement is actually expressed as a percentage: the reflectance of the incident light at a fixed angle with the paper blackened by a black body divided by the reflectance of the incident light when the sheet is backed by a white body. It is measured using Technityne, BNL3 opacimeter.

Smoothness (TAPPI 538)

The surface property of a paper sheet related to its degree of uniformness and flatness and is evaluated by the procedure.

In the examples, the ratio of the surface areas obtained by BET and Mercury porosimetry were used to characterize pigments. BET surface area is the area measurement taken by adsorption/desorption of nitrogen molecule on the surface. The equipment used was Nova, N-1000 (Quantachrome). This technique will give the total surface area which is available to the nitrogen molecule to adsorb. See B. D. Adkins, and B. H. Davis, "Comparison of Nitrogen Adsorption and Mercury Penetration Results", Adsorption Science Technology, Vol. 5., p. 76, 1988. Surface area measurement by Mercury porosimetery is carried out by finding the total volume available for mercury to penetrate under pressure. Surface area is subsequently calculated from the intruded volume using an assumption of cylindrical pores. The ratio of the two measurements may be used to characterize the high print gloss pigments of the invention. Mercury porosimetry was carried out using Autoscan 33 (Quantachrome).

If significant amount of fines are not generated during delamination process, the BET surface area of the feed and the product will be similar. This may be explained by the fact that the BET surface area of a booklet is nearly equal to that of the delaminated particles from that particular booklet. In case of a surface area measurement by Mercury porosimetry there would be a more drastic increase in the surface area before and after delamination. This is because when the clay is in a booklet morphology the intrusion of mercury is limited. If the particles are completely delaminated the surface area as measured by the two techniques should be very similar.

In the examples some standard paper coating pigment products were used as the basis of comparison for use as a paper coating pigment to achieve high print gloss for light weight coatings. Properties of other delaminated and deslimed kaolin pigments are included in the examples for further purposes of comparison.

The examples also show properties of products obtained from feed containing coarse or fine booklets and demonstrate the effects of the presence or absence of primary fines, as well as the and presence of primary or secondary fines, where the secondary fines were generated by unit operations such as delamination or Netzsch milling.

A product made in accordance with the teachings of the patent of Gunn et al (supra) was also used as a control (standard) delaminated pigment. In the Gunn patent (supra), a standard No. 3 clay was delaminated to a No. 1 particle size. The standard products has significantly larger surface area as compared to the high print gloss pigments of the invention because the primary or the secondary fines were not removed from the product.

Typical Coarse white crude found in middle Georgia and used in illustrative examples has the following characteristics:

55–60 wt % finer than 2 micrometer

40–45 wt % finer than 1 micrometer

25–35 wt % finer than 0.5 micrometer

10–20 wt % finer than 0.3 micrometer 10 wt % or less than 0.2 micrometer

Average particle size is in the range of 1.7–1.95 micrometer.

Surface area is less than 17 $m^2/g$ as determined by BET analysis.

The crude typically has a high level of grit, therefore it is degritted by centrifugation. Typical characteristic of degritted crude are:

60–70 wt % finer than 2 micrometer

45–55 wt % finer than 1 micrometer

25–35 wt % finer than 0.5 micrometer

10–20 wt % finer than 0.3 micrometer 12 wt % or less than 0.2 micrometer

Average particle size of degritted crude in the range of 0.55–0.90 micrometer.

Surface area of degritted crude is of less than 18 $m^2/g$ as determined by BET analysis.

In the following examples, delamination was performed in a standard stirred tank delaminator using glass beads at solids content between 20 and 30%. The bead content of the delaminators was 45–50%. Delamination was performed in a batch system for 30 minutes unless otherwise stated. Removal of the primary or the secondary fines ("desliming") was achieved by employing a standard or a disk-nozzle centrifuge. In those examples in which the paper coating studies were performed, a slurry of delaminated kaolin pigments was bleached with a hydrosulfite bleach to meet a brightness specification and flocced with sulfuric acid (target pH 3.5) and alum (at 6 lbs/ton of dry clay) for filtration. Filtration in the following examples was performed using pan filters. The filtercake was washed and re-dispersed using a blend of soda ash and polyacrylate (C-211) as a dispersant. This was followed by spray drying.

In some examples, a Netzsch mill, with glass media at 80% bead volume ("Model 60 Liter Netzsch Mill") was employed to further delaminate the particles. All Netzsch milling operations were performed at high solids content (50–60%). High solids slurries were achieved by floc/filtering the low solids slurry and re-dispersing the filter cake with a dispersant, such as a blend of soda ash/caustic and polyacylate.

EXAMPLE 1A

In this example, a degritted coarse white (soft) kaolin crude was delaminated to a typical No. 2 clay particle size. The characteristics of the degritted crude and the delaminated sample are given in Table 1. This example is illustrative of the results of a delaminating to produce a No. 1 pigment with both primary and secondary fines. This product was made in accordance with the teaching of Gunn, et al. (Supra).

EXAMPLE 1B

The feed of Example 1A was deslimed to remove the primary fines and then delaminated to about 79.8 finer than 2 micrometers. The delamination was carried out under the same conditions as in Example 1A. The characteristics of the deslimed and the delamination products are given in Table 1. Data in this table show that a higher Delamination Index was obtained by desliming prior to delamination; this translates to a better delamination rate for the same Delamination Index.

EXAMPLE 1C

Example 1 B was repeated with a deeper desliming cut.

The results of the particle size testing are reported in Table 1. The data show that removal of fines clearly helped to increase the Delamination Index.

TABLE 1

CHARACTERISTICS OF FEED TO A DELAMINATOR

| Example | Particle size distribution, wt. % at micrometers indicated | | | | | BET Surface Area $m^2/g$ | Ratio of Mercury Surface Area/BET Surface Area |
|---|---|---|---|---|---|---|---|
| | 2 | 1 | 0.5 | 0.3 | 0.2 | | |
| 1A | 69 | 56 | 39.4 | 23.5 | 14 | 15.6 | 0.56 |
| 1B | 64.6 | 48.9 | 28.5 | 12.1 | 4.6 | 13.1 | 0.57 |
| 1C | 62.7 | 46.5 | 25.1 | 9.6 | 3.5 | 12.7 | 0.56 |

CHARACTERISTICS OF DELAMINATOR PRODUCT

| Ex | Particle size distribution Wt. % at micrometers indicated | | | | | BET Surface Area $m^2/g$ | Ratio of Mercury Surface Area/BET Surface Area | Delamination Index |
|---|---|---|---|---|---|---|---|---|
| | 2 | 1 | 0.5 | 0.3 | 0.2 | | | |
| 1A | 82.9 | 67.3 | 44.6 | 24.4 | 12.8 | 16.2 | 0.50 | 13.9 |
| 1B | 79.8 | 61.7 | 35.3 | 15 | 6.3 | 13.9 | 0.65 | 15.2 |
| 1C | 80.5 | 62.3 | 35.8 | 14.6 | 5.9 | 13.5 | 0.68 | 17.8 |

EXAMPLE 2

Control

This example illustrates the production of a No. 1 delaminated pigment without removing primary fines or secondary fines.

The degritted crude had the following characteristics:

60.4 wt % finer than 2 micrometer
46.3 wt % finer than 1 micrometer
27.2 wt % finer than 0.5 micrometer
14.5 wt % finer than 0.3 micrometer
7.4 wt % finer than 0.2 micrometer
Average particle size 1.20 micrometer.

This degritted crude sample was passed through a magnet.

It was subsequently flocced with acid-alum, bleached to a GE brightness of 87 and filtered. The filter cake was redispersed using a blend of sodium polyacrylate and soda ash as a dispersant. The solid content of the slurry was 55%. This slurry was milled in a Netzsch Mill to 86.46 finer than 2 micrometer. The characteristics of the product are:

86.4 wt % finer than 2 micrometer
70.6 wt % finer than 1 micrometer
46.8 wt % finer than 0.5 micrometer
26.5 wt % finer than 0.3 micrometer
15.6 wt % finer than 0.2 micrometer
Average particle size 0.54 micrometer.

Surface area of the pigment: 16.1 $r^2/g$ as determined by BET analysis.

Surface area of the pigment: 14.2 $m^2/g$ as determined by Mercury porosimetry.

The ratio of surface area by Mercury to BET measurement was 0.88.

Delamination Index was 26.4.

This pigment does not meet the particle size distribution of products of this invention.

EXAMPLE 3

A standard non-delaminated kaolin pigment used commercially for LWC application was evaluated. This product is prepared by removing coarse booklets from degritted soft crude by centrifugation and then the particle size distribution is made narrower by removing primary fines.

Typically, the product has a No. 1 particle size.

The characteristics of a sample of this product was:

89 wt % finer than 2 micrometer
17 wt % finer than 0.3 micrometer
10 wt % finer than 0.2 micrometer
Average particle size 0.62 micrometer.

Surface area of the pigment: 12.7 $m^2/g$ as determined by BET analysis.

Surface area of the pigment: 11.81 $m^2/g$ as determined by Mercury porosimtry.

The ratio of surface area by Mercury to BET measurement was 0.93.

Delamination Index of this product was 0.

Brightness about 87.5%.

EXAMPLE 4

This example demonstrates the results of processing a soft crude by removing the coarse booklets followed by removal of the primary fines, followed by delamination. The Delamination Index of this product was 7.

A standard coarse soft crude was centrifuged to a particle size of about 90% at 2 micrometer and from the resulting slurry the fines were removed using a centrifuge.

The resulting slurry was delaminated using standard delamination techniques The characteristics of the product are:

95.4 wt % finer than 2 micrometer
81.4 wt % finer than 1 micrometer
47.4 wt % finer than 0.5 micrometer
17.4 wt % finer than 0.3 micrometer
10.4 wt % finer than 0.2 micrometer
Average particle size 0.51 micrometer Surface area of the pigment: 14.3 $m^2/g$ as determined by BET analysis.

Surface area of the pigment: 13.3 $m^2/g$ as determined by Mercury porosimetry.

The ratio surface area by Mercury to BET measurement was 0.93.

The slurry was treated in a high intensity magnetic separator and bleached to a brightness specification of 89.4%. This was followed by standard processing including filtration, washing and spray drying.

EXAMPLE 5

This example illustrates the processing of a crude from which the coarse booklets were removed. This was followed by delamination and then removal of the secondary fines. The extent of delamination in this product was minimal.

A standard coarse soft crude was beneficiated by froth flotation, followed by centrifugation to a particle size of about 90 at 2 micrometer and delamination to a particle size of 97% finer than 2 micrometer. A portion of the partial secondary fines were removed from the resulting pigment. The characteristics of the product are 94 wt % finer than 2 micrometer
79 wt % finer than 1 micrometer
40 wt % finer than 0.5 micrometer
13 wt % finer than 0.3 micrometer
4 wt % finer than 0.2 micrometer
Average particle size 0.58 micrometer.
Surface area of the pigment: 14.5 m²/g as determined by BET analysis.

The Delamination Index was 7.

The sample was subsequently bleached to a 90.5 & brightness followed by floccing and filtration. The sample was re-slurried and spray dried.

EXAMPLE 6

This example illustrates the processing of a crude by removing primary fines before delamination. In the processing, the delamination resulted in secondary fines. Thus, the product contained secondary fines but not primary fines.

The standard coarse white crude was degritted to about 67% finer than 2 micrometers followed by removal of the primary fines. The resulting material was 60% by weight finer than 2 micrometers and about 5% by weight finer than 0.2 micrometers. This was floated followed by delamination. This material was bleached to a 90.5% brightness followed by flocculation and filtration. The filter cake was redispersed using a dispersant (blend of C211 and soda ash) and milled in a Netzsch mill to the following particle size:

90.0 wt % finer than 2 micrometer
76.5 wt % finer than 1 micrometer
46.5 wt % finer than 0.5 micrometer
26.2 wt % finer than 0.3 micrometer
14.4 wt % finer than 0.2 micrometer
Average particle size 0.53 micrometer.
Surface area of the pigment: 16.8 m²/g as determined by BET analysis.

The Delamination Index was 30.

Note that this product does not meet the particle size distribution characteristics of this invention although it did have an ideal Delamination Index. In Example 13, it will be demonstrated that the pigment performance on paper was not as good as that achieved using pigments of this invention.

EXAMPLE 7

This example, illustrates practice of this invention by substantially removing primary fines and then delaminating while restricting the generation of the secondary fines.

Degritted crude had the following characteristics
65.2 wt % finer than 2 micrometer
51.1 wt % finer than 1 micrometer 34.0 wt % finer than 0.5 micrometer 20.9 wt % finer than 0.3 micrometer 12.7 wt % finer than 0.2 micrometer
Average particle size 0.95 micrometer.

The degritted crude was passed through a magnet and the primary fines were removed using a disk nozzle centrifuge. After removal of the primary fines, the slurry had the following particle size distribution:

61.1 wt % finer than 2 micrometer
44.2 wt % finer than 1 micrometer
41.4 wt % finer than 0.5 micrometer
8.6 wt % finer than 0.3 micrometer
3.7 wt % finer than 0.2 micrometer
Average particle size 1.26 micrometer.

This pigment slurry was then delaminated in a standard delaminator to produce delaminated pigment product 88% finer than 2 micrometer. The characteristics of the product were:

88.8 wt % finer than 2 micrometer
69.5 wt % finer than 1 micrometer
38.6 wt % finer than 0.5 micrometer
15.8 wt % finer than 0.3 micrometer
6.6 wtt finer than 0.2 micrometer
Average particle size 0.62 micrometer.
Surface area of the pigment: 13.6 m²/g as determined by BET analysis.
Surface area of the pigment: 9.8 m²/g as determined by Mercury porosimetery.

The ratio Surface area by Mercury to BET measurement was 0.72.

The Delamination Index was 27.6.

EXAMPLE 8

A portion of the slurry of delaminated kaolin from Example 7 was bleached, flocced and filtered. The filtercake was re-dispersed and milled in a: Netzsch mill to achieve a product 88% finer than 2 micrometer. The characteristics of the product were:

87.4 wt % finer than 2 micrometer
71.0 wt % finer than 1 micrometer
43.0 wt % finer than 0.5 micrometer
19.1 wt % finer than 0.3 micrometer
8.6 wt % finer than 0.2 micrometer
Average particle size 0.57 micrometer.
Surface area of the pigment: 15.0 m²/g as determined by BET analysis.
Surface area of the pigment: 8.6 m²/g as determined by Mercury porosimetery.

The ratio Surface area by Mercury to BET measurement was 0.57.

Delamination Index was 26.3.

EXAMPLE 9

This example is similar to Example 7 and is also illustrative of the present invention.

Degritted crude was passed through a magnet. The characteristics of the particles were:
62.9 wt % finer than 2 micrometer 48.9 wt % finer than 1 micrometer
29.7 wt % finer than 0.5 micrometer
16.0 wt % finer than 0.3 micrometer
8.2 wt % finer than 0.2 micrometer
Average particle size 1.05 micrometer.

The primary fines from this slurry were removed using a centrifuge to get the following characteristics of the particles:

56.9 wt % finer than 2 micrometer
38.7 wt % finer than 1 micrometer
18.0 wt % finer than 0.5 micrometer
6.6 wt % finer than 0.3 micrometer
1.7 wt % finer than 0.2 micrometer
Average particle size 1.53 micrometer.

This sample was delaminated in a standard delaminator to get a particle size of about 85% finer than 2 micrometer. The characteristics of the product were:

85.0 wt % finer than 2 micrometer
62.4 wt % finer than 1 micrometer
29.1 wt % finer than 0.5 micrometer
11.3 wt % finer than 0.3 micrometer
4.5 wt % finer than 0.2 micrometer
Average particle size 0.77 micrometer.
Surface area of the pigment: 14.0 m$^2$/g as determined by BET analysis.
Surface area of the pigment: 11.57 m$^2$1 g as determined by Mercury porosimetry.
The ratio of surface area by Mercury to BET measurement was 0.82.
Delamination Index was 28.1.
This slurry was bleached to a brightness of 88.5%.

EXAMPLE 10

The product of Example 9 was filtered to make high solids material and then passed through a Netzsch mill to achieve a particle size of about 92% finer than 2 micrometer.

The characteristics of the products were:

91.8 wt % finer than 2 micrometer
75.4 wt % finer than 1 micrometer
43.4 wt % finer than 0.5 micrometer
19.4 wt % finer than 0.3 micrometer
9.0 wt % finer than 0.2 micrometer
Average particle size 0.56 micrometer
Surface area of the pigment: 14.9 m$^2$/g as determined by BET analysis.
Delamination Index was 35.1.

EXAMPLE 11

This example is similar to Example 10.
Degritted crude was passed through a magnet. The characteristics of the particles were:

66.4 wt % finer than 2 micrometer
51.8 wt % finer than 1 micrometer
32.8 wt % finer than 0.5 micrometer
17.8 wt % finer than 0.3 micrometer
10.6 wt % finer than 0.2 micrometer
Average particle size 0.93 micrometer.

The primary fines were removed using a centrifuge to get the following characteristics of the particles:

64.9 wt % finer than 2 micrometer
47.4 wt % finer than 1 micrometer
24.5 wt % finer than 0.5 micrometer
9.7 wt % finer than 0.3 micrometer
3.9 wt % finer than 0.2 micrometer
Average particle size 1.09 micrometer.

This sample was delaminated in a standard delamination mill. The characteristics of the product were:

88.7 wt % finer than 2 micrometer
71.8 wt % finer than 1 micrometer
42.0 wt % finer than 0.5 micrometer
18.4 wt % finer than 0.3 micrometer
8.5 wt % finer than 0.2 micrometer
Average particle size 0.58 micrometer.

This sample was bleached to a 88.0% brightness and subsequently filtered to make high solids material and then passed through a Netzsch Mill to achieve a particle size of about 92% finer than 2 micrometer. The characteristics of the product were:

91.6 wt % finer than 2 micrometer
76.4 wt % finer than 1 micrometer
47.0 wt % finer than 0.5 micrometer
23.4 wt % finer than 0.3 micrometer
11.7 wt % finer than 0.2 micrometer
Average particle size 0.53 micrometer.
Surface area of the pigment: 16.7 m$^2$/g as determined by BET analysis.
Surface area of the pigment: 15.8 m$^2$/g as determined by Mercury porosimetery.
The ratio of surface area by Mercury to BET measurement was 0.97.
Delamination Index was 26.7.

Note that this product does not meet the particle size distribution characteristics of products of this invention although it does have the ideal Delamination Index. Example 13 will show that the pigment performance of the resulting pigment was less than desired when coated on paper.

EXAMPLE 12

The crude had the following characteristics:

57.0 wt % finer than 2 micrometer
44.3 wt % finer than 1 micrometer
28.3 wt % finer than 0.5 micrometer
16.0 wt % finer than 0.3 micrometer
9.5 wt % finer than 0.2 micrometer
Average particle size 1.87 micrometer.

This crude was degritted and passed through a magnet. The particle size was:

67.4 wt % finer than 2 micrometer
51.3 wt % finer than 1 micrometer
32.4 wt % finer than 0.5 micrometer
18.4 wt % finer than 0.3 micrometer
10.8 wt % finer than 0.2 micrometer
Average particle size 0.94 micrometer.

The primary fines were removed using a centrifuge to achieve the following characteristics:

60.8 wt % finer than 2 micrometer
42.0 wt % finer than 1 micrometer 18.7 wt % finer than 0.5 micrometer 6.9 wt % finer than 0.3 micrometer 3.6 wt % finer than 0.2 micrometer Average particle size about 1.35 micrometer.

This sample was delaminated in a standard delamination mill. The characteristics of the product were:

86.8 wt % finer than 2 micrometer 65.0 wt % finer than 1 micrometer 28.9 wt % finer than 0.5 micrometer 8.7 wt % finer than 0.3 micrometer 2.5 wt % finer than 0.2 micrometer Average particle size 0.73 micrometer.

Surface area of the pigment: 12.7 $m^2/g$ as determined by BET analysis.

Surface area of the pigment: 10.7 $m^2/g$ as determined by Mercury porosimetry.

The ratio of surface area by Mercury to BET measurement was 0.84.

Delamination Index was 26.0.

In the following examples, pigment performance in paper was evaluated using as a control NUCLAY® kaolin, a standard LWC pigment product that is 80 finer than 2 micrometers and is about 15% finer than 0.2 micrometers. The Delamination Index of this product ranges from 10–15. Typically, BET surface area is between 14 and 17 $m^2/g$ and the ratio between the surface area by Mercury and BET varies between 0.70 and 0.90.

EXAMPLE 13A

A coating study was performed on a 38# wood containing base stock with the following coating formulation for a sheet with a targeted coat weight of 5.5 lb/300 ft²

0.80 parts by weight of Nopcote® C-104

100 parts by weight pigment 9 parts by weight of Starch (PG-280)

0.27 part by weight Sunreze® 700C resin 8 parts by weight of latex (Dow 692)

pH=8.2–8.5

Coating Solids—57%

The pigments used were: standard Nuclay (which can be classified as delaminated clay with primary and secondary fines), and pigments of Examples 4, 9, 10, and 11. Of these, the pigments of Examples 9 and are products of this invention.

The results tabulated in Table 2, indicate that the pigment made in accordance with the present invention (pigments 9 and 10) had superior optical and print properties as compared to standard delaminated products. Also, pigments 9 and performed better than pigment 4, which has a narrow particle size distribution but a low Delamination Index.

Pigments 9 and also performed better in optical properties as compared to pigment 11, which had a high Delamination Index but did not meet the particle size distribution of pigments of the invention.

It should be noted that the GE brightness of pigment 4 was 89.4% as compared to 87–88.5% for the other products; this may explain the slightly better brightness seen on the sheet for pigment 4 as compared to other experimental pigments.

TABLE 2

COMPARISON OF OPTICAL AND PRINT PROPERTIES OF EXPERIMENTALS WITH STANDARD DELAMINATED KAOLIN PIGMENTS

| PRODUCT | SHEET GLOSS, % DELTA Nuclay | PRINT GLOSS, % DELTA Nuclay | OPACITY, % DELTA Nuclay | BRIGHTNESS, % DELTA Nuclay |
|---|---|---|---|---|
| Example 11 | 9 | 6 | 0.2 | 0.8 |
| Example 10 | 10 | 6 | 1.3 | 1.3 |
| Example 9 | 9 | 7 | 1.5 | 1.1 |
| Example 4 | 9 | 5 | 0.7 | 1.8 |
| Standard Delaminated Nuclay | 55 | 73 | 81.9 | 68.6 |

Delta = Difference in value from value obtained using NUCLAY kaolin.

EXAMPLE 13B

A coating study was performed on a 28–30# wood—containing basestock with the following coating formulation for a sheet with a targeted coat weight of 2.0 and 2.5 lb/300 ft2.

95 parts by weight kaolin pigment 8 parts by weight of starch PG-280

5 parts by weight titania pigment 8 parts by weight of Latex Dow 640 pH=8.2–8.5

0.5 parts by weight of Nopcote C-104

Coating Solids—54%

At such low coat weights the difference in the sheet and print gloss are more apparent between pigments. However, due to the use of parts of titania, only very small difference in other optical properties are expected.

In this coating study, pigments of Examples 6 and 10 were compared to standard delaminated products. Pigment 10 and NUCLAY kaolin have standard GE brightness of 88% while the pigment of Example 6 had a GE brightness of 90.5%. The pigments of Examples 6 and are similar in the extent of delamination but differ in the particle size distribution characteristics. The pigment of Example 10 meets the criteria of the present invention but the pigment 6 has a finer particle size at 0.2 micrometers. Also, the surface area of the pigment of Example 6 was comparable to that of a No. 1 clay.

The results in Table 3 and 4 show that the pigment 10 was superior at both the coat weights. In spite of such difference in the GE brightness of the pigments, the pigment of this invention gave better sheet brightness values at low coat weights. At higher coat weights of 3.0 and 4.0 lb/ft2 these difference are smaller due to overwhelming effect of the coat weights and such small differences between the pigments of Examples 6 and 10.

It can be seen from data in Tables 3 and 4 that by increasing the coat weight the optical and print properties improved. However, at both the coat weights the print and the sheet gloss of the pigment of Example was superior to that of Pigment 6. This clearly shows the advantage of the pigment of the invention versus the standard delaminated pigment.

TABLE 3

COAT WEIGHT 2.0 lb/3300 ft²
COMPARISON OF OPTICAL AND PRINT PROPERTIES OF EXPERIMENTAL VS. STANDARD DELAMINATED PRODUCTS

| PRODUCT | SHEET GLOSS DELTA Nuclay | PRINT GLOSS DELTA Nuclay | OPACITY DELTA Nuclay | BRIGHTNESS DELTA Nuclay |
|---|---|---|---|---|
| Example 10 | 5 | 6 | 0.6 | 0.6 |
| Example 6 | 0 | 2 | 0 | 0.1 |
| Standard Delaminated Nuclay | 49 | 58 | 81.3 | 68.1 |

TABLE 4

COAT WEIGHT 2.5 lb/3300 ft2
COMPARISON OF OPTICAL AND PRINT PROPERTIES OF EXPERIMENTALS VS. STANDARD DELAMINATED

| PRODUCT | SHEET GLOSS DELTA Nuclay | PRINT GLOSS DELTA Nuclay | OPACITY DELTA Nuclay | BRIGHTNESS DELTA Nuclay |
|---|---|---|---|---|
| Example 10 | 6 | 8 | 0 | 0.9 |
| Example 6 | 4 | 3 | 0 | 0.4 |
| Standard Delaminated Nuclay | 54 | 60 | 81.9 | 68.5 |

EXAMPLE 13C

A coating study was performed on a 28–30# wood—containing basestock with the following coating formulation for a sheet with a targeted coat weight of 5.5 lb/3300 ft2. 100 parts by weight pigment 8 parts by weight of starch (PG-280)
0.27 part by weight Sunreze® 700C resin
8 parts by weight of Dow 640 latex
pH=8.2–8.5 0.5 parts of Nopcote C-104 resin
Coating Solids—57%

The pigments used were standard NUCLAY pigment of Example 3 (pigment with narrow PSD but no delamination). Pigments of Examples 9, 10, 12 and pigment of Example 2 which is a delaminated pigment with primary and secondary fines. The results from Table 5 indicate that the pigments made in accordance with the present invention have superior optical and print properties as compared to standard delaminated and the control pigments. Also, it can be seen that the pigments made in accordance with the present invention give smoother coated sheets.

TABLE 5

COMPARISON OF COATED SHEET PROPERTIES

| PRODUCT | SHEET GLOSS DELTA Nuclay | PRINT GLOSS DELTA Nuclay | OPACITY DELTA Nuclay | BRIGHTNESS DELTA Nuclay |
|---|---|---|---|---|
| Example 10 | 11 | 7 | 1.9 | 1.7 |
| Example 9 | 8 | 7 | 1.6 | 1.3 |
| Example 2 | 8 | 4 | 0.2 | 0.3 |
| Example 12 | 8 | 4 | 2.0 | 1.7 |
| Example 3 | 2 | 1 | 1.0 | 0.9 |
| Standard Delaminated Nuclay | 50 | 66 | 84.3 | 66.0 |

| PRODUCT | SMOOTHNESS*, PPS |
|---|---|
| Example 10 | 1.02 |
| Example 9 | 0.91 |
| Example 2 | 1.05 |
| Example 12 | 0.99 |
| Example 3 | 1.13 |
| Standard Delaminated Nuclay | 1.23 |

*Lower Number is better (0.1 is significant difference)

EXAMPLE 13D

A paper coating study was performed to evaluate the effectiveness of a delaminated kaolin pigment of the invention in replacing $TiO_2$ and plastic pigment in coating formulation.

A coating study was performed on a 28–30# wood-containing basestock with the following coating formulation for a sheet with a targeted coat weight of 4.5 lb/3000 ft2. All proportions are reported on a weight basis.

| Pigment | 8 parts of starch PG-280 |
|---|---|
| 0.50 part Sunrez 700C | 8 parts of Dow 640 latex |
| pH = 8.2–8.5 | 0.5 parts of Nopcote C-104 |
| Coating Solids- - 56% | |

The pigments used were: Nuclay kaolin; RPS titanium dioxide (TiO2) from Dupont Chemical Company; and HP-91 plastic pigment from Rohm & Haas.

The data reported in Table 6 show that the product of invention can replace a formulation containing about 5 parts by weight of plastic pigment, 2.5 parts by weight of TiO2 and 92.5 parts by weight standard delaminated kaolin, designated "N" in the table.

TABLE 6

Comparison of Sheet Properties of Paper Coated with Delaminated Kaolin Pigments of the Invention and Blends of Standard Delaminated Kaolin Plastic Pigment and Titania Pigment

| PIGMENT CONTENT | SHEET GLOSS % | OPACITY % | BRIGHTNESS % | PRINT GLOSS % |
|---|---|---|---|---|
| 95% n + 5% PLASTIC | 62.7 | 84.0 | 66.2 | 73 |
| 97.5% N + 2.5% TiO2 | 51.2 | 83.8 | 66.7 | 67 |
| 92/5% N + 5% PLASTIC + 2.5% TiO2 | 62.2 | 84.3 | 67.4 | 73 |
| 90% N + 5% PLASTIC + 5% TiO2 | 62.4 | 85.5 | 68.2 | 74 |
| EXAMPLE 9 | 61.7 | 84.9 | 66.6 | 74 |

TABLE 6-continued

Comparison of Sheet Properties of Paper Coated with Delaminated Kaolin Pigments of the Invention and Blends of Standard Delaminated Kaolin Plastic Pigment and Titania Pigment

| PIGMENT CONTENT | SHEET GLOSS % | OPACITY % | BRIGHTNESS % | PRINT GLOSS % |
|---|---|---|---|---|
| EXAMPLE 10 | 66.3 | 84.8 | 66.4 | 78 |
| 100% STANDARD Delaminated Nuclay(N) | 54.6 | 82.4 | 65.4 | 70 |

We claim:

1. A delaminated kaolin pigment in the form of thin plate-like particles derived from kaolin stacks and consisting essentially of thin platelike particles which are at least 85% finer than 2 micrometers, e.s.d., have an average particle size in the range of 0.55 micrometers to 0.90 micrometers and are less than 10% by weight finer than 0.2 micrometers, said particles having a BET surface area in the range of 9 to m²/g and a ratio of surface area as measured by Mercury porosimetry to surface area as measured by BET in the range of 0.6 to 0.95, said pigment having a Delamination Index in the range of to 45.

2. The pigment in claim 1 which has a GE brightness in the range of 80–95%.

3. The pigment in claim 1 which the Delamination Index is in the range of 20–40.

4. The pigment of claim 3 wherein the said Index is 30.

5. The pigment of claim 1 wherein at least 90% by weight of particles are finer than 2 micrometers e.s.d.

6. In a process for mechanically delaminating a source of kaolin stacks to produce thin plate like particles, the improvement which comprises first removing particles smaller than 0.2 micrometers before mechanically delaminating said source of stacks; and then mechanically delaminating said source of kaolin stacks to reduce the percent by weight of particles finer than 2 micrometers, e.s.d., by between and 45 percentage points, thereby resulting in a product having a Delamination Index in the range of to 45.

7. The process of claim 6 including the additional step of reducing the particle size of the mechanically delaminated kaolin by high solids milling.

8. The process of claim 6 wherein the delaminated product is at least 85% finer than 2 micrometers, e.s.d., has an average particle size in the range of 0.55 micrometers to 0.90 micrometers and is less than 10% by weight finer than 0.2 micrometers, and has a BET surface area in the range of 9–15 m²/g, and the ratio of surface area as measured by Mercury porosimetry to surface area as measured by BET is in the range of 0.6–0.95; and the Delamination Index is in the range of 25–40.

* * * * *